United States Patent
Kapanen

Patent Number: 5,835,889
Date of Patent: Nov. 10, 1998

[54] METHOD AND APPARATUS FOR DETECTING HANGOVER PERIODS IN A TDMA WIRELESS COMMUNICATION SYSTEM USING DISCONTINUOUS TRANSMISSION

[75] Inventor: Pekka Kapanen, Tampere, Finland

[73] Assignee: Nokia Mobile Phones Ltd., Salo, Finland

[21] Appl. No.: 672,932

[22] Filed: Jun. 28, 1996

[30] Foreign Application Priority Data

Jun. 30, 1995 [FI] Finland ................................ 953252

[51] Int. Cl.⁶ .................................................. G10L 9/18
[52] U.S. Cl. ............................................ 704/215; 704/233
[58] Field of Search ................................ 704/215, 233

[56] References Cited

U.S. PATENT DOCUMENTS

| | | | |
|---|---|---|---|
| 4,897,832 | 1/1990 | Suzuki et al. | 370/81 |
| 5,615,298 | 3/1997 | Chen | 704/228 |

FOREIGN PATENT DOCUMENTS

| | | |
|---|---|---|
| 0 565 504 A1 | 10/1993 | European Pat. Off. . |
| 0 593 255 A1 | 4/1994 | European Pat. Off. . |
| 2 256 351 | 12/1992 | United Kingdom . |
| 2 256 997 | 12/1992 | United Kingdom . |
| 2 285 204 | 6/1995 | United Kingdom . |
| 2 288 102 | 10/1995 | United Kingdom . |
| WO 93/13516 | 7/1993 | WIPO . |

OTHER PUBLICATIONS

Japanese Patent Abstract JP 060053927 A (NEC Corp) E-1255, vol. 18, No. 280, pp. 154.
European digital cellular telecommunications system (Phase 2); Sep. 1994; pp. 7–14.

*Primary Examiner*—David R. Hudspeth
*Assistant Examiner*—Tālivaldis Ivars Šmits
*Attorney, Agent, or Firm*—Perman & Green, LLP

[57] ABSTRACT

A method to detect a presence of a hangover period in a speech decoder in a communication system that utilizes discontinuous transmission between a transmitter and a receiver. The discontinuous transmission is defined by temporally sequential frame periods of which some periods will contain a transmitted frame and some periods will contain no transmission. The discontinuous transmission is constituted by information transmission periods of at least one frame that contain information given by a user to the transmitter, and silence periods having a length of at least one frame period and containing other information than that given by the user. An irregularly occurring period (T) of at least one frame exists between an information transmission period and the following silence period, the irregularly occurring period forming a hangover period for determining the information relating to the silence period. In the receiver the number of frame periods is counted until a certain moment; the beginning of the silence period is detected; and, based on said counted number of frame periods and the beginning of the silence period, a determination is made whether or not there is a hangover period (T) between the information transmission period and the silence period.

8 Claims, 6 Drawing Sheets

METHOD AND APPARATUS FOR DETECTING HANGOVER PERIODS IN A TDMA WIRELESS COMMUNICATION SYSTEM USING DISCONTINUOUS TRANSMISSION

FIELD OF THE INVENTION

The invention relates generally to speech encoding and decoding used in digital radio systems, and particularly to how the hangover period used after speech periods in a discontinuous transmission mode is utilized in a speech decoder. The invention particularly relates to a method to evaluate the hangover period in a speech decoder in a communication system using discontinuous transmission between the transmitter and the receiver, whereby the discontinuous transmission comprises temporally sequential frame periods of which some periods will contain transmitted frames and some periods contain no transmission, whereby the method contains steps to generate information transmission periods comprising at least one frame and containing information given by a user to said transmitter device, and silence periods having a length of at least one frame period and containing other information than that given by the user, whereby there is an irregularly occurring period comprising at least one frame between the information transmission period and the next silence period, the irregular period forming a hangover period to determine the information relating to the silence period. Correspondingly the invention relates to a speech decoder and a transceiver embodying the method.

BACKGROUND OF THE INVENTION

Below we illustrate how the speech encoding and decoding relates to the functions of a radiotelephone, and in order to better understand the invention we explain the transceiver operation in a cellular mobile communication system. As an example we describe with reference to FIG. 1 the transmit and receive functions of the Pan-European GSM system based on time division multiple access, the figure showing a block diagram of a transceiver of a mobile phone according to the GSM system. A transceiver of a base station differs from that of a mobile phone in that it has no microphone or speaker, but in other respects it is basically similar to the transceiver of a mobile phone.

The first step of the transmission sequence is to digitize 1 and to encode 2 the speech. The sampling with the A/D converter 1 is made at 8 kHz, and the speech encoding algorithm presumes the input signal to be 13 bit linear PCM. Samples from the A/D converter are segmented into speech frames of 160 bits each, so that the length of each frame is 20 ms. The speech encoder 2 processes speech frames with a length of 20 ms, i.e. the buffer receives 20 ms of speech before the encoding begins. Encoding operations are made on each frame, or on their subframes (blocks of 40 bits). The encoding in the speech encoder 2 results in 260 speech parameter bits for one frame.

After speech encoding 2 channel encoding 3 is made in two steps, so that first the 50 most important of the total of 260 bits in a speech parameter frame are protected by a block code 3a (=CRC, 3 bits), and then these and the next most important bits (132) are further protected by a convolution code 3b (encoding ratio 1/2) ((50+3+132+4)*2=378), and a part of the bits (78) are taken without protection. As shown in FIG. 1, the block encoding section 3a receives signaling and logic messages directly from the control unit 19 which controls the telephone sections, and thus of course these information messages are not speech encoded. In a corresponding way the signaling and logic messages received at the reception, are supplied from the channel decoding section 15 to the control unit. In the block encoding 3a a bit sequence is added at the end of the speech frame, whereby this bit sequence enables the detection of transmission errors at the reception. The convolution encoding 3b increases the redundancy of the speech frame. Thus in total 456 bits are transmitted for each frame of 20 ms.

These 456 bits are interleaved 4, and the interleaving also comprises two steps. First 4a the bits are shuffled and arranged in eight blocks of equal size. These blocks are further divided 4b into eight sequential TDMA frames, or the 456 interleaved bits are transmitted in eight time slots on the radio path (57 bits in each time slot). Usually the transmission errors occur as error bursts, and thus the object of the interleaving is to spread the errors evenly over the transmitted data, whereby the channel decoding will operate more efficiently. After de-interleaving the error burst is converted into single error bits, which can be corrected by the channel decoding. The next step in the transmission sequence is the data encryption 5. The encryption is made by an algorithm, which is one of the best kept secrets of the GSM. The encryption prevents unauthorized listening, which is possible in analog networks.

The encrypted data is formed 6 into a transmission burst by adding to it a training sequence, trailing bits and a protection period. The transmission burst is supplied to a GMSK modulator 7, which modulates the burst for the transmission. The GMSK modulation method (Gaussian Minimum Shift Keying) is a digital modulation method with a constant amplitude, where the information is contained in phase shifts. With the aid of one or several intermediate frequencies the transmitter 8 up-converts the modulated burst to 900 Mhz, and transmits it through the antenna on the radio path. The transmitter 8 is one of the three radio frequency parts RF. The receiver 9 is the first section on the reception side, and compared to the transmitter 8 it performs the inverse operations. The third RF part is a synthesizer 10, which generates frequencies. The GSM system utilizes frequency hopping, whereby the transmission and receiving frequencies change for each TDMA frame. Frequency hopping improves the connection quality, but imposes strict requirements on the synthesizer 10. The synthesizer 10 must be able to switch very quickly from one frequency to another, in less than one millisecond.

The inverse operations are performed at the reception. After the RF receiver 9 and the demodulator 11 a detection 12 is made e.g. by a channel equalizer, which detects the bits in the received samples, in other words, it tries to make out the transmitted bit sequence. After the detection there is decryption 13 and de-interleaving 14, and the detected bits are channel decoded 15 and an error check sum is checked by a cyclic redundancy check (CRC). The channel decoding 15 tries to correct bit errors occurring during the transmission of a burst. After the channel decoding 15 the speech parameter frame of 260 bits will contain the transmitted parameters which describe the speech and with which the the speech decoder 16 regenerates the digital samples of the speech signal. The samples are D/A-converted 17 to be reproduced by the speaker 18.

The transmitter/receiver has a control unit 19, which is the central unit controlling the mobile station, and which controls substantially all sections 1 to 18, coordinates their operation and controls the timing. The control unit 19 usually comprises a microprocessor, for example.

The GSM system is based on Time-Division Multiple Access (TDMA), and two frequency bands of 25 MHz each are reserved for it: in a mobile unit 890–915 MHz for transmission and 935–960 MHz for reception. These frequency bands are divided into 124 frequency channels with a spacing of 200 kHz. According to the TDMA principle each frequency channel is divided into 8 time slots. Each mobile phone is given one time slot for transmission and reception, so that each frequency channel can simultaneously carry eight calls. The communication on the radio path occurs as bursts in said time slots, whereby each burst is transmitted in its own time slot. In the GSM system the transmission ratio 271 kbit/s provides in a period 577 µs a burst with a length of 156.25 bits, whereby the length of a TDMA frame of eight time slots is 4.615 ms. FIG. 2 shows transmission and reception as seen by one mobile phone having one time slot RX2 for reception and one time slot TX2 for transmission in each TDMA frame comprising eight time slots. Thus a mobile phone has transmission during a period of 0.577 ms in each TDMA frame with a length of 4.615 ms.

In digital cellular radiotelephone systems, such as the GSM system (Global System for Mobile Communications), a so called Discontinuous Transmission (DTX) mode is generally used to switch off the transmitter of the radiotelephone during the larger part of the time when the user is not speaking, i.e. when the telephone has nothing to transmit. The object of this is to reduce the average power consumption of the radiotelephone and to improve the utilization of the radio frequencies, because the transmission of a signal conveying only silence causes unnecessary interference in other simultaneous radio connections. In order to clarify the background of the invention we will below present a rather detailed description of a prior art method to use discontinuous transmission in speech encoding and decoding. The GSM system with its designations, abbreviations and standards are used as an example to illustrate the background and the applicability of the invention, but the invention is by no means limited only to the GSM system.

FIG. 3 shows the block diagram of a radio system transmitter device comprising a speech encoding device or the speech encoder 102. The digitized speech signal 101 received at its input port 100 is processed in the speech encoder 102 in periods called speech frames. The length of one speech frame is usually about 10 to 30 ms (in GSM 20 ms), and the sampling frequency of the speech signal 101 with which it is transformed into a digital form is usually 8 kHz. The frames generated by the speech encoder 102 comprise a set of parameters 103, which are transmitted via the respective port 111 to the radio section of the terminal equipment of the corresponding digital cellular network in order to be further transmitted to the receiver. In this text, the radio section of the transmitter is considered to begin from the input of the channel encoder, i.e., the port 111 of the speech encoder is directly connected to the radio section of the transmitter.

The speech encoder of FIG. 3 comprises a Voice Activity Detection (VAD) block 104 which indirectly controls the discontinuous transmission function. It detects the presence of information, such as speech, which is to be transmitted, i.e. it detects when the processing relates to both noise and speech and when there is only noise to be processed. It operates continuously, and thus it examines whether the user speaks into his phone or not. The function of the voice activity detector 104 is based on internal variables 105 of the speech encoder, and the output signal 106 generated by it is preferably one bit, which is called the VAD flag. The value 1 of the VAD flag then corresponds to a situation in which the processing concerns the user speaking, and the value 0 corresponds to a situation where the user is silent, and the processing in the speech encoder concerns only noise. A certain value of the VAD flag always relates to a certain frame generated by the speech encoder 102. The function of a typical voice activity detection block 104 is described in detail in the GSM standards GSM 06.32 and GSM 06.42 and in the patent publication WO 89/08910.

According to the well known functional principle the speech encoder 102 continuously transmits frames via the port 111 to the radio section of the transmitter device. Each frame contains a certain bit, the so called SP flag 107 which tells whether the corresponding frame contains speech parameters (value 1 of the SP flag) or whether the frame is a so called Silence Descriptor or SID frame (value 0 of the SP flag). Certain parameters, which are described below, are transmitted in the SID frame to the receiver, or there is no transmission during this frame (which represents the silence period of the discontinuous transmission, when there is no actual transmission). In the radio section of the transmitter, the processing of the frames and their transmission over the radio interface to the receiver depends on the value of the SP flag, as well as on the scheduling of the transmission of SID frames based on the TDMA multiframe structure. In order to realize discontinuous transmission the speech encoder has a discontinuous transmission mode control unit 112, which controls the function of the speech encoder 102 (which i.a. sets the value of said SP flag 107) and of the SID memory 110, which is described below. Preferably the control unit or block 112 is realized in software, and it is well known according to the GSM standards. Typical embodiments of the discontinuous transmission mode control unit 112 and the SID memory 110 for the GSM system are described in the GSM standards GSM 06.31 and GSM 06.41.

The discontinuous transmission mode has one basic problem which is caused by the background noise in the transmission. According to the above presented definition discontinuity means that when said VAD block 104 detects that the user is not speaking and informs the control block 112 about this, the supply of speech frames to the receiving user over the radio interface is discontinued. The background noise heard in the background of the speech is also discontinued when the transmission is discontinued. Then the receiving user will perceive the interrupted transmission so that the noise heard in the earpiece is quietened. In discontinuous transmission the transmission can be interrupted very fast and at irregular intervals, so that the receiving user perceives the rapidly changing sound level as disturbing. Particularly when the transmitting user is in a noisy environment, such as a car, the receiving user can have difficulties in understanding the transmitting user's speech. A generally used solution to the described problem is to generate in the receive side synthetic noise which resembles the background noise and is called comfort noise, during the interruptions in the transmission. The comfort noise parameter calculation block 108 in the transmit side calculates the parameters required to generate the comfort noise, and these parameters are transmitted to the receiver in the silence descriptor or SID frame immediately after the speech period and before the transmission is discontinued, and at long intervals but regularly thereafter (depending on the scheduling of the transmission of SID frames based on the TDMA multiframe structure). SID frames transmitted at long intervals also during the discontinued transmission will provide means to prepare for changes in the background noise and they provide a possibility for the receiver's noise generator to adapt to these changes.

It has been found that a comfort noise of good quality as heard by the receiving user can be generated in the receiver device if the parameters it received from the transmitter in a SID frame sufficiently well describe the background noise level and the envelope of the acoustic spectrum at the transmitting side. These background noise characteristics usually slightly change with time, so that in order to get a representative sample the comfort noise calculation process must average the background noise level and the shape of the spectrum envelope during a few speech frames. The GSM standards GSM 06.31 and GSM 06.41 define the function of a full rate and a half rate speech encoder in continuous transmission, and in the first mentioned case the averaging period is 4 speech frames and in the second case 8 speech frames, whereby the length of one speech frame is 20 ms.

The concept of the so called hangover period was defined in order to leave sufficient time for the transmitter to determine the first SID frame, which contains parameters required for the generation of comfort noise after the speech period 200 is terminated and before the transmission is discontinued. The hangover period means the time when the VAD block 104 has detected that the speech has ended (value of the VAD flag 106 is 0), but when speech frames are still transmitted (value of the SP flag 107 is 1). This situation is illustrated in FIG. 4, where the value of the VAD flag 106 is reset to zero immediately when the speech has ended, but the value of the SP flag is reset to zero only after the hangover period T. During the hangover period it can be ensured that the processed signal comprises only noise, because the VAD block has detected that the user is not speaking. Thus the information contained in the speech frames 201 to 207 processed during the period T can be used to determine the parameters required for the generation of the comfort noise.

The length of the hangover period T depends on the averaging time of the noise measurement. It must be long enough so that the averaging process can be finished, and so that it will be possible to send the proper parameters to the receive side for the generation of comfort noise. When full rate GSM speech encoding is used the length of the hangover period equals the averaging time or 4 frames (speech frames), and the comfort noise parameters are calculated particularly according to these frames. In a half rate GSM encoder the length of the hangover period is 7 frames (speech frames) because the eighth frame (speech frame) belonging to the averaging period is obtained from the speech encoder during the period when the first SID frame (208 in FIG. 4) is processed. FIG. 4 concerns particularly the latter case, i.e. it presents the relation between the hangover period T and the averaging time, when a half rate GSM speech encoder is used. The averaging period relating to the first SID frame 208 is marked by the segment of a line 211 and the averaging period relating to the second SID frame is marked by the segment of a line 212.

When the hangover period is completed and the speech encoder produces SID frames, an algorithm in the comfort noise parameter calculation block 108 continues to estimate the characteristics of the background noise. The speech encoder forwards a SID frame to the transmitter's radio section 111 during each such frame when the SP flag 107 gets a value of zero. As was mentioned above, all SID frames are not transmitted to the receiver, in order to obtain the benefits of the discontinuous transmission mode by switching the transmitter off when no frames are scheduled for transmission. The radio section schedules for transmission the first SID frame after the speech period and before the transmission is discontinued, and thereafter SID frames at long intervals but regularly based on the TDMA multiframe structure. The control block 112 supplies to the block 108 information about the end of an averaging period by setting the value 1 for the flag 109. Normally the value of this flag is 0, but its value is set to 1 when the updated SID frame is sent to the transmitter's radio section 111. When the flag 109 gets the value 1, i.e. when the averaging period is completed, then the comfort noise parameter calculating algorithm performs the averaging and places the updated SID frame in the radio section so that it is ready to be directed further in the transmit branch (to the channel encoder 3 in FIG. 1). If a new averaging period is completed during a certain frame, then the speech encoder calculates a new SID frame and supplies it to the radio section 111 and writes the SID parameters thus obtained to be stored in the SID memory block 110. If the averaging period is not completed and the SP flag 107 gets a value of zero (as after a short speech period), then the newest calculated SID parameters stored in the SID memory block are read out and supplied to the radio section 111. If the speech period was very short, i.e. if a period less than 24 frames long elapsed from the time when the last SID frame was generated and supplied to the radio section, then during the next frames the last SID frame is repeatedly fetched from the SID memory 110 and supplied to the radio section until a new updated SID frame is available, i.e. until one averaging period has elapsed. The objective of this function is to reduce unnecessary transmission activity in such cases where short background noise peaks are inadvertently interpreted as speech, because then no hangover period is used to generate a new SID frame after the respective short speech period.

Thus the transmitter's radio section 111 gets from the speech encoder a SID frame each time when the SP flag 107 gets a zero value. The radio section always transmits to the receiver the first SID frame after the speech period. Then the transmission is discontinued and the radio section continuously transmits at a low rate to the receiver an updated SID frame at regular intervals (at intervals of 24 frames at full rate encoding in the GSM system). Accurate updating moments are synchronized to the TDMA multiplexing of the mobile phone system. The speech encoder has no information of which of the SID frames it supplied to the radio section 111 will be transmitted to the receiver.

FIG. 5 shows the longest possible period without a hangover period. According to the figure it comprises two separate speech periods 301 and 302, and in the period between them an old SID frame SIDk is used. The combined length of the periods 301, 302 and 303 is 22 periods (frames) in the figure, and after them there is also a period 304 having a length of 7 frames, during which the old SID frame SIDk is used. A certain bit or flag (113 in FIG. 3) is used to inform the SID memory 110 that it shall store a new updated SID frame, or that the last updated SID frame stored in the memory shall be read out and supplied to the radio section. The SID memory makes a decision to store or to read depending on the value of the flag 113 each time when the SP flag 107 has a zero value.

When a half rate GSM speech encoder is used we also need a flag 114, which indicates the first SID frame to the comfort noise parameter calculating algorithm. Normally the value of the flag is 0, but it is set to 1 during one frame, when the first SID frame following a speech period is transmitted, irrespective of whether or not a hangover period is used after this speech period.

FIG. 6 shows in the form of a block diagram a speech decoder (block 16 in FIG. 1), located in the receiver of a system using the discontinuous transmission mode. Frame by frame it receives parameters 401 via the input port 400 from the receiver's radio section (i.e. from the blocks located in front of the speech decoder 16 in the receiver branch, in FIG. 1 from the channel decoder 15), whereby the parameters are processed in the speech decoder to synthesize the speech signal and sent to the D/A converter via the port 404 to be delivered to the user's ear.

The receiver section processing the discontinuous transmission receives from the radio section i.a. the SP flag bit 405, which is related to each frame and corresponds functionally to the SP flag at the transmitting side. Its value is 1 when the received frame is a speech frame, i.e. when it contains speech information, and the value is 0 when the received frame is a SID frame, or when the transmission is discontinued. The value of the flag bit 406 which the receiver section processing the discontinuous transmission also receives from the radio section 400 tells the comfort noise generation block 407 of the speech decoder that a new SID frame (which are seldom transmitted, as was mentioned when the speech encoder was described) has arrived at the receiver from the transmitter's radio section 111. Based on this information the comfort noise generation block 407, by interpolating, begins to move frame by frame, from the currently used comfort noise parameter values towards the new, lately received parameter values. The value of the flag bit 406 is normally 0, but it will get the value 1 for the duration of one frame when the value of the SP flag is 0 and the radio section has received a new SID frame.

When in the receiver the SP flag 405 has the value 0, i.e. when it has detected that it does not receive any speech frames, then the speech decoder's comfort noise generation block 407 generates comfort noise based on the information measured from the background noise at the transmitting side and conveyed by the SID frames.

The discontinuous transmission control unit 408 in the receiver obtains as input the SP flag 405, and it outputs a flag bit 409 whose value is usually 0 but is set to 1 during one frame when the speech decoder receives the first SID frame after the speech period. The flag bit 409 is required in the GSM system half rate speech decoder to indicate to the comfort noise generating algorithm when the so called GS parameters must be averaged. We return to the meaning of these parameters farther below.

In the discontinuous transmission mode and in the case of the full rate speech encoder of the GSM system the calculation and transmission of a new updated SID frame to the radio section of the transmitter device always means that the parameters representing the background noise (level and spectral envelope) are averaged during one averaging period and quantized with the same scalar quantization method used in the quantization phase of the normal speech encoding. Correspondingly, when a full rate speech decoder is used in the receiver the parameters contained in the SID frame are dequantized with the same dequantization method which is used in the dequantization phase of the normal speech decoding. These processes are described in more detail in the GSM standards GSM 06.12 and GSM 06.10.

In the discontinuous transmission mode and in the case of the half rate speech encoder of the GSM system the parameters representing the spectral envelope of the background noise are always averaged during one averaging period when a new updated SID frame must be calculated. They are quantized with the same vector quantization method which is used for the quantization of the corresponding parameters in the quantization phase of the normal speech encoding. In the receiver the parameters representing the spectral envelope of the background noise contained in the SID frame are dequantized by the same method which is used in the dequantization phase of the normal speech decoding. These processes are described in more detail in the GSM standards GSM 06.22 and GSM 06.20.

In the case of the half rate speech encoder of the GSM system the parameter representing the level of the background noise is processed differently. The quantization method with which the noise level is processed in relation to the normal speech encoding is based on a combination of parameters which are quantized and transmitted separately. A SID frame, which is processed in the speech decoder, can transmit only one parameter representing the noise level, the parameter being the energy value R0. This is mainly due to the fact that certain bits in the SID frame must be reserved for the SID code word. These processes are described in more detail in the GSM standards GSM 06.22 and GSM 06.20.

The energy value R0 relating to each frame is averaged over one averaging period and it is quantized with the same method that is used in normal speech encoding to process the R0 parameter, which was not averaged.

Thus it is not possible to transmit in the SID frames the so called GS parameters, which describe the energy variations and which are required in addition to the R0 parameter to describe the background noise level at the transmitting side. However, they can be calculated locally in the same way both in the transmitter and in the receiver. This is based on the fact that the quantized GS parameters of the last seven frames are stored in memory both in the transmitter and in the receiver. When the first SID frame is transmitted both devices compute an average of the stored GS parameters, so that both averaged GS parameters will have the same values, because the quantized GS parameters are transmitted in the speech frames during the speech period. Communication errors can of course change the values. Calculation of the GS parameters is well known to a person skilled in the art, and a typical method for their calculation is presented in the GSM specification 06.20: "European digital cellular telecommunications system; Half rate speech Part 2: Half rate transcoding".

The GS parameters obtained by averaging are used during the whole comfort noise period until the receiver receives the next SID frame after a speech period. They are used for the calculation of the noise level both in the encoding and the decoding phase instead of the real GS parameters, which are, however, transmitted in the speech frames of the next speech period for a new averaging.

The method according to prior art described above has some disadvantages. In the receiver the control unit 408 of the speech decoder does not know whether a speech period is followed by a hangover period or not. When half rate speech encoding of the GSM system is used, the GS parameters are stored also during those speech periods which are so short that they are not followed by any hangover period. It is possible that these short periods contain only short and strong peaks of the background noise, so that the stored and averaged GS parameters in the transmitter and the receiver in fact describe a much higher noise level than the actual average noise level present at the transmitting side.

Below we briefly discuss quantization which is based on so called predicting methods, which is a well known signal processing technology known by a person skilled in the art and described in detail for example in the publication |1|: Allen Gersho and Robert M. Gray, "Vector Quantisation and Signal Compression". In many modern speech encoding methods the parameters relating to the speech encoding are quantized using predictive methods. This means that the quantization block in advance tries to make an as accurate as possible estimate of the value of the quantized object. In such methods only a difference between the predicted and the measured value or their ratio is usually transmitted to the receiver. The receiver contains a predictor operating by the same principle, so that the actual value is obtained by adding or multiplying the predicted value and the transmitted difference signal.

In predictive quantization the prediction method is usually adaptive, i.e. the result of the quantization is used to update the prediction method. The prediction method used by both the encoder and the decoder is updated by the same parameter value obtained from the quantization, so that they always will operate in the same way.

The adaptive characteristics of the predictive quantization methods will make them very difficult to apply to the quantization of parameters, which are related to the generation of comfort noise and transmitted in SID frames. Because the transmission is discontinued between the speech periods it is impossible to maintain the synchronization between the prediction method in the transmitter and in the receiver and thus to keep the speech encoder and decoder synchronized.

SUMMARY OF THE INVENTION

The object of this invention is to present a method with which the receiving device will detect when a hangover period follows a speech period. An object of the invention is also to present a method with which it is possible to retain the synchronization between the transmitter's speech encoder and the receiver's speech decoder during the hangover period in a communication system using discontinuous transmission.

The objects of the invention are reached by detecting in the receiver, more precisely in the speech decoder, whether or not there is a hangover period of said kind between said information transmission period and the period without transmission following the information transmission period. The result of this detection is preferably indicated by defining in a new way the use of flag bits representing certain characteristics of certain transmitted frames. Then no new signal wires or paths are required for the indication, but the signal wire and path already present is used to indicate the presence or absence of the hangover period.

The method according to the invention is characterized in that in the receiver the number of frame periods is counted until a certain moment, the beginning of said silence period is detected, and based on said counted number of frame periods and the beginning of the silence period it will be decided whether or not there is a hangover period of said type between said information transmission period and the silence period following the information transmission period.

The speech decoder and the transceiver according to the invention is characterized in that it comprises means counting the number of frame periods until a predetermined moment, means detecting the beginning of said silence period, and means deciding on the basis of said counted number of frame periods and the beginning of the silence period whether or not there is a hangover period of said type between said information transmission period and the silence period following the information transmission period.

In order to inform the comfort noise generating algorithm about the presence of a hangover period, the control unit of the receiver's discontinuous reception and the definitions of the flags relating to the ending of the hangover period are in the method according to the invention improved from that known in prior art, as mentioned above.

BRIEF DESCRIPTION OF THE DRAWINGS

The invention is described below with reference to the enclosed drawings, in which.

DETAILED DESCRIPTION OF THE INVENTION

Figure 1:
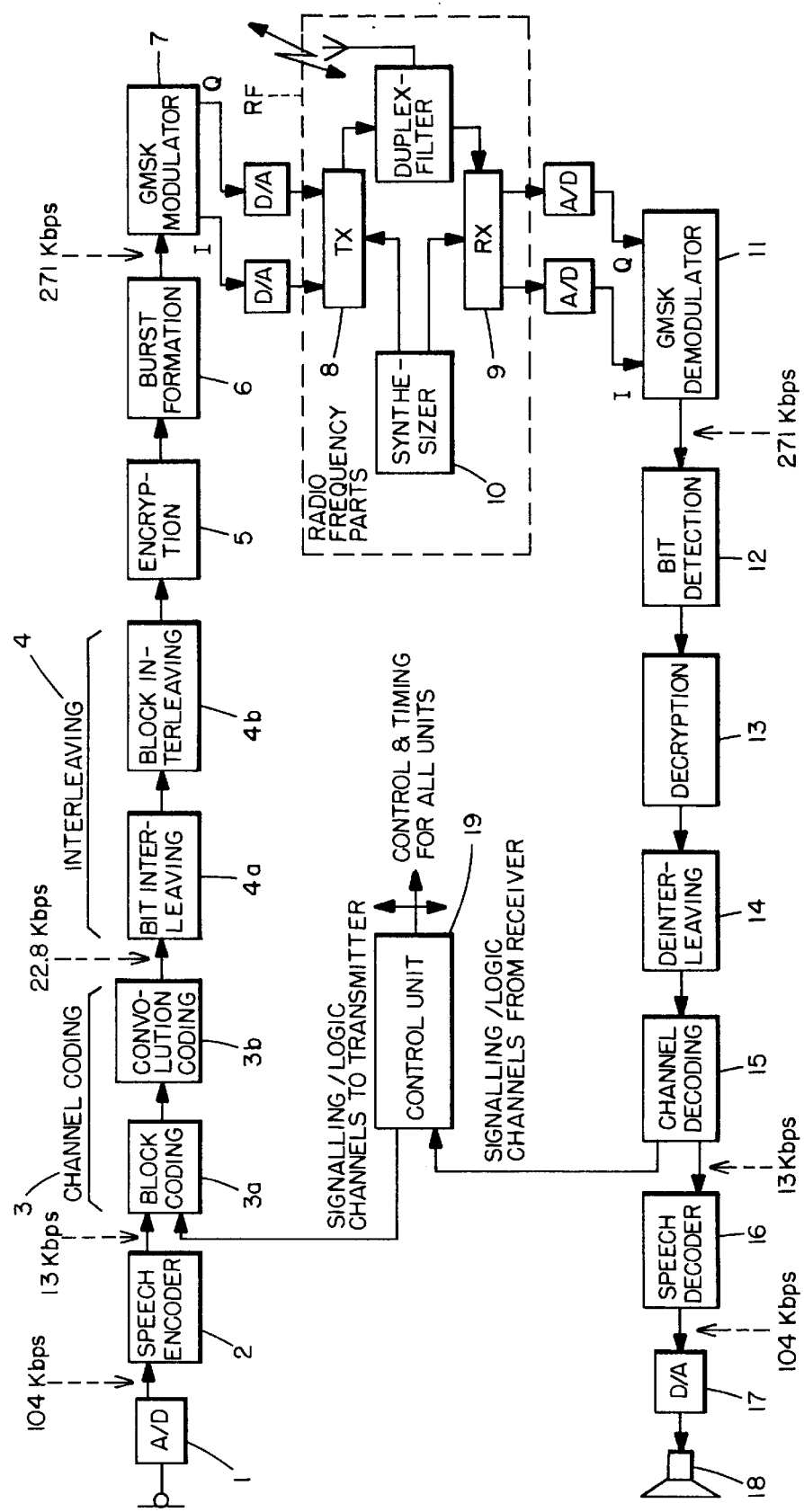
FIG. 1 shows the block diagram of a transceiver in the GSM system.
Figure 2:
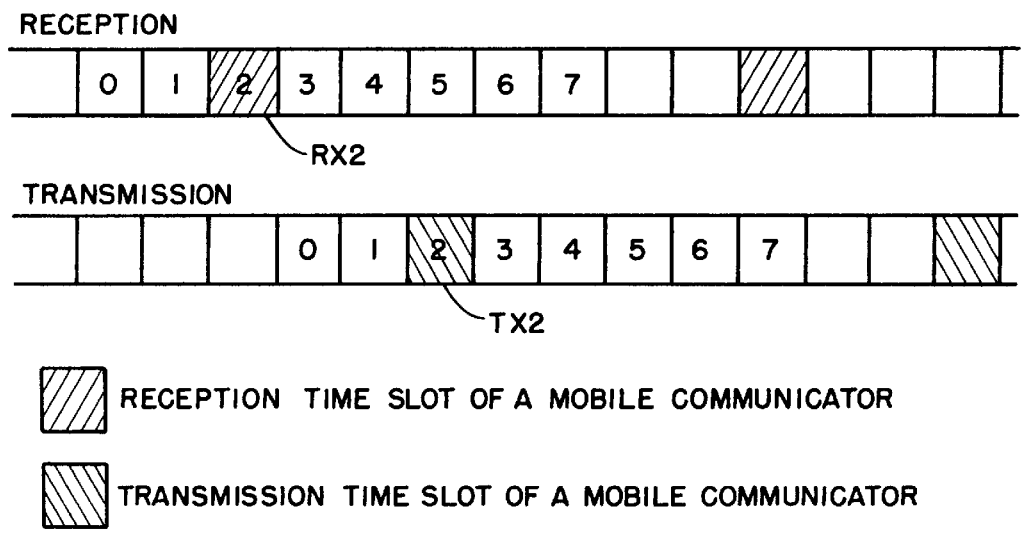
FIG. 2 shows the principle of time division multiple access.
Figure 3:
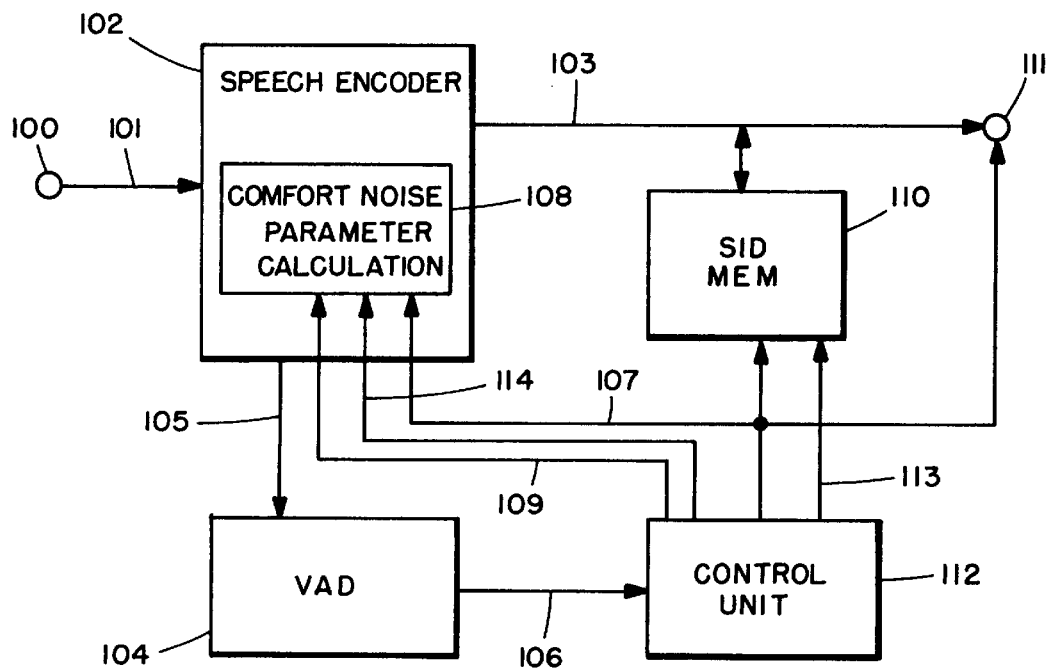
FIG. 3 shows a speech encoder as a block diagram.
Figure 4:
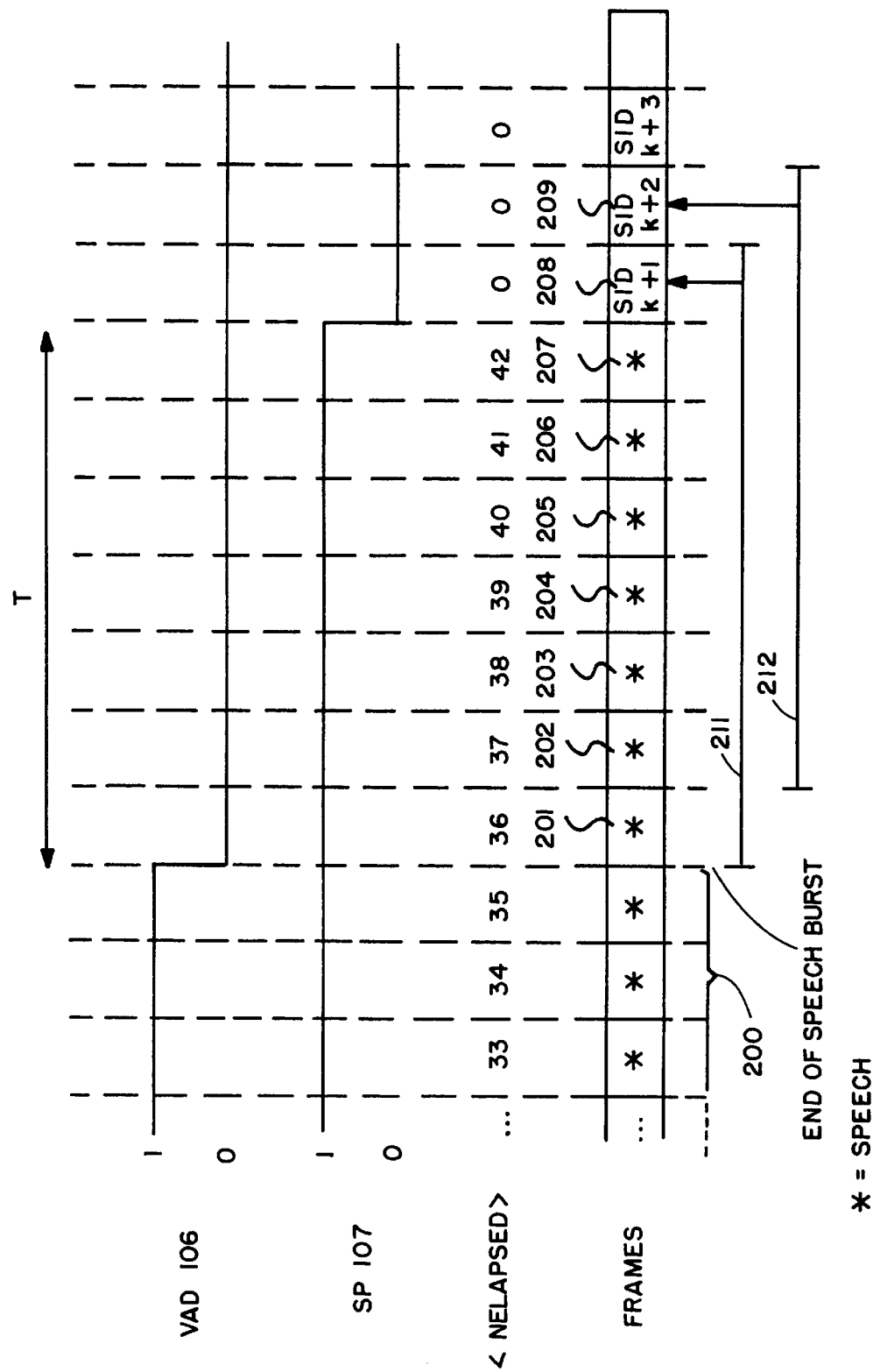
FIG. 4 shows a known process to use flag bits to define the hangover period and the averaging period.
Figure 5:
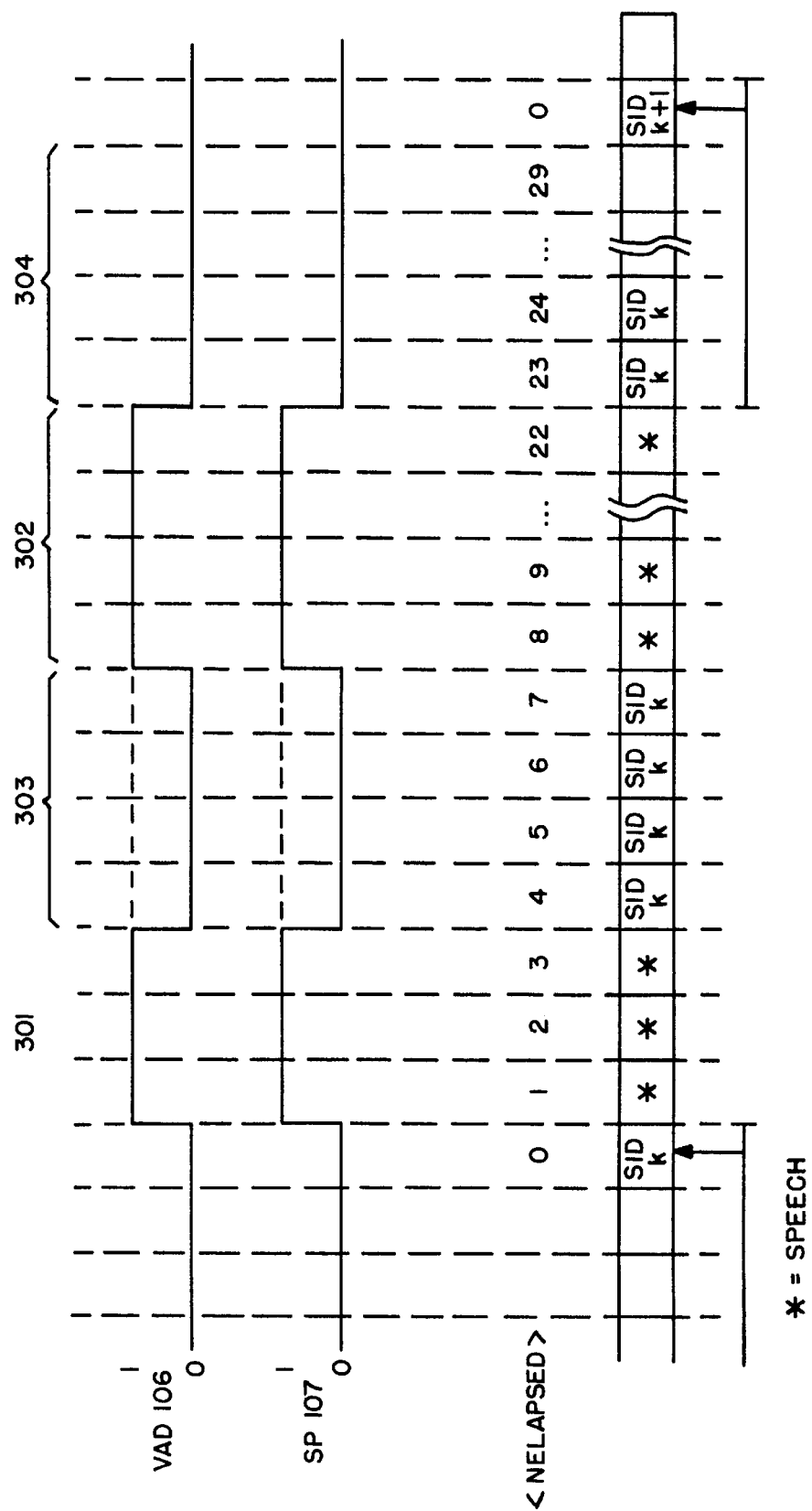
FIG. 5 shows a known process relating to the use of the hangover period.
Figure 6:
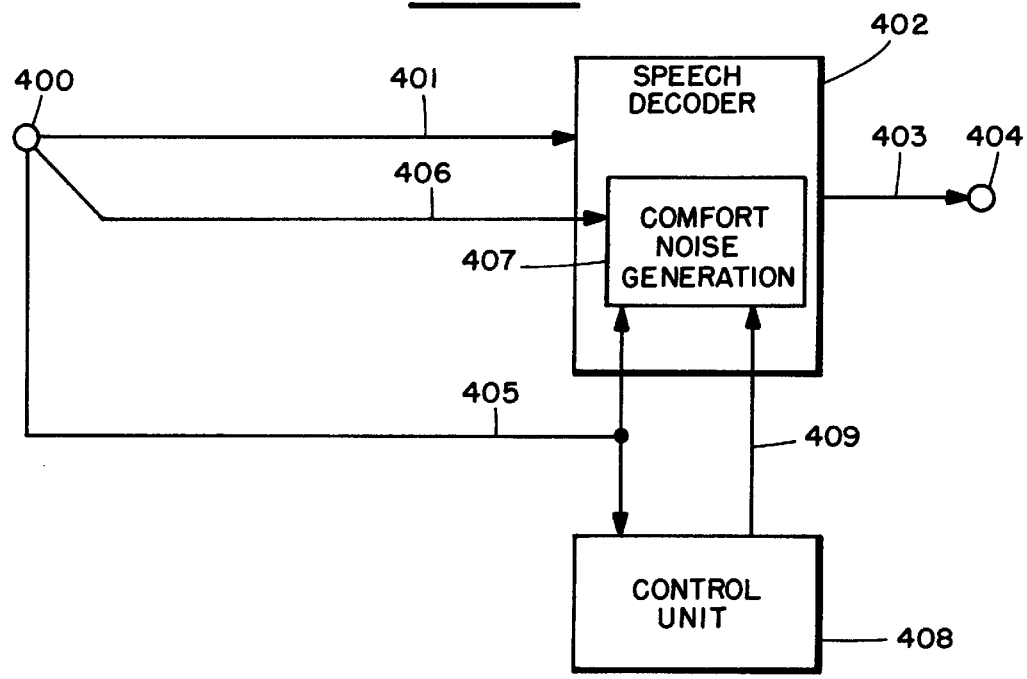
FIG. 6 shows a speech decoder as a block diagram.

A preferred embodiment of the invention will now be described with reference mainly to FIGS. 3 to 7. In other respects a speech decoder can be realized like the decoder known in the prior art as is shown in FIG. 6, but its control unit 408 is arranged to realize the functions according to the invention. The control unit 408 may be according to FIG. 8. In a receiver's speech decoder the control unit 408 (FIG. 6) still is supplied with the SP flag 405 as input information, but when the flag 409 is set to 1 it means according to the definition according to the invention that the hangover period is completed, i.e. it is set to 1 for the duration of one frame (and particularly during the SID frame following immediately after the hangover period) when the hangover period has been completed. In the discontinuous transmission mode control unit 112 of the transmitter shown in FIG. 1 the flag 114 in the method according to the invention correspondingly indicates the completion of the hangover period (and not the first SID frame as in prior art), i.e. it will also be set to 1 for the duration of one frame (particularly during the SID frame following immediately after the hangover period).

Figure 8:
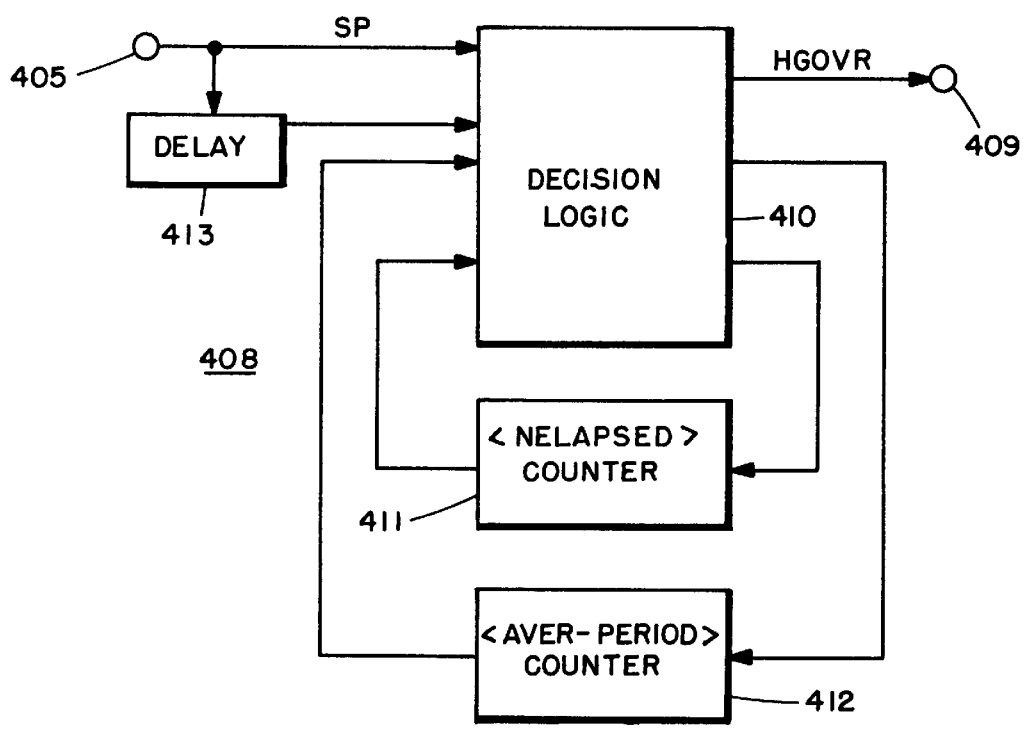
FIG. 8 shows a block diagram of a control unit of a speech decoder according to the invention.
Figure 7:
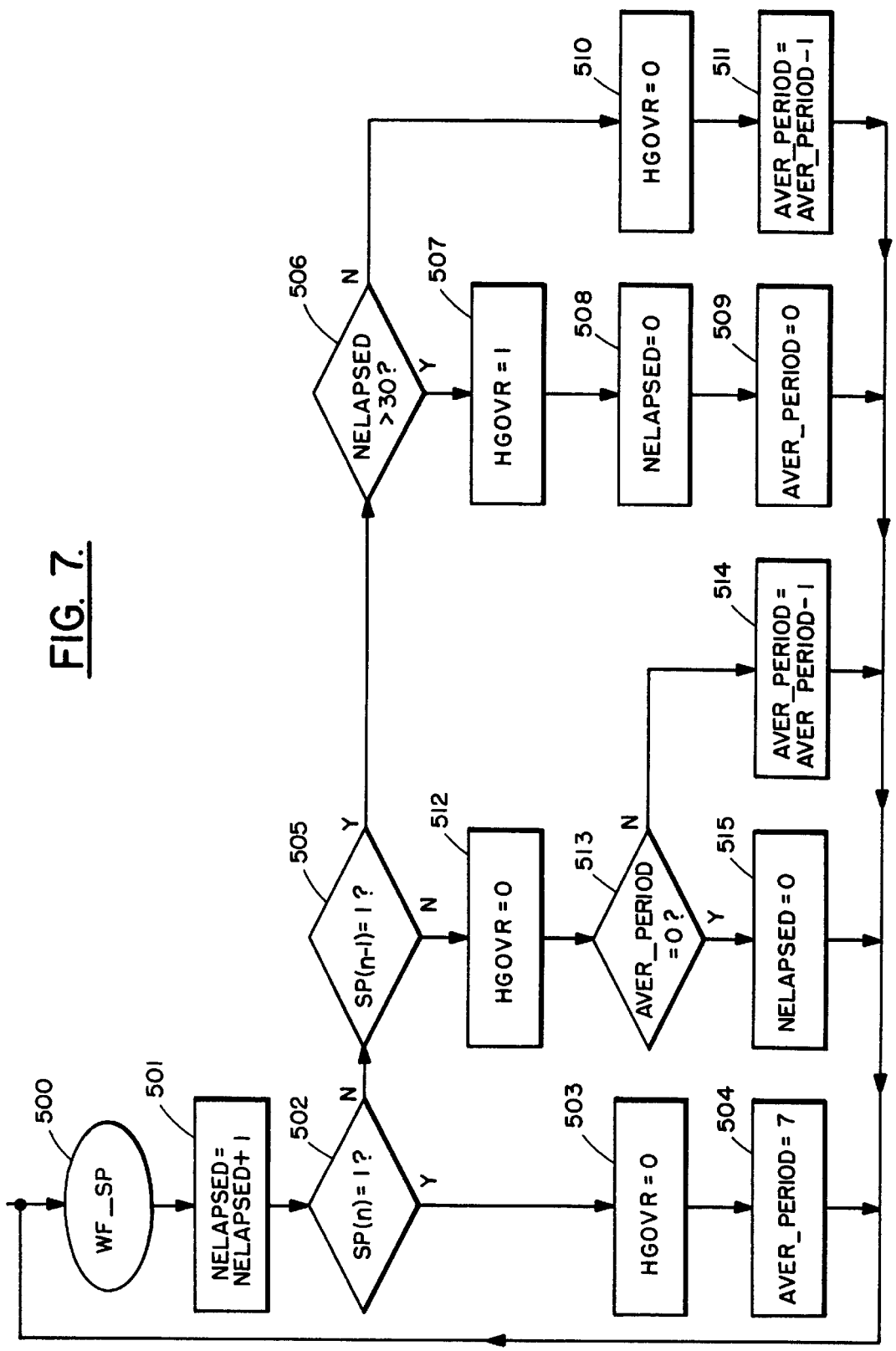
FIG. 7 shows the process according to the invention as a block diagram.

FIG. 7 shows the function of the discontinuous transmission mode control unit 408 of the receiver as a block diagram in the method according to the invention, which below is described with reference also to FIG. 8. The reference numeral 500 represents the step <WF_SP> (Wait For SP flag), in which the SP flag (405 in FIG. 4) of each received frame is examined as input data. The algorithm always returns to the step 500 to wait for the SP flag of the next frame. The diamond blocks of the block diagram represent decision steps, and the alternative paths from them are marked with the letter Y (yes) and N (no).

The counter <Nelapsed> 411 counts the number of frame periods from that moment when the transmitter's speech encoder transmitted the last updated SID frame and always until the next updated SD frame, or until the last frame period of the averaging period. The count is advanced by one as a default in the block 501 each time the SP flag 405 of a new frame is input to the control unit of the receiver's discontinuous reception. In step 502 the decision logic 410 takes a decision regarding the hangover period on the basis of the value of the SP flag 405 contained in the current frame (n refers to the consecutive number of the frame under examination). If the value of the SP flag is 1, then the hangover period is not yet completed, so the HGOVR flag 409 is reset to zero by the decision logic 410 in step 503, and the counter <Aver_period> 412, which indicates the number of still remaining frames belonging to the averaging period, is set to the value 7 in step 504.

If the value of the SP flag in the current frame is 0, then the hangover period may have ended. The next decision when this fact is examined is based on the SP flag of the frame immediately preceding the examined frame, whereby this flag is obtained from the output of a delay block 413 with a delay of one frame period, and the decision is made by the decision logic 410 in step 505. If the value of the previous SP flag was 1, then the hangover period may have ended. Then in step 506 a decision is made based on the value of the counter <Nelapsed> 411. If the value of the counter 411 is greater than 30, then the hangover period is completed because then during the speech period (see FIG. 3) the value of the counter <Nelapsed> 411 has become larger than 23 (in order to use the hangover period at all) and then there has been a hangover period of 7 frames, i.e. the value of the counter <Nelapsed> 411 is at least 31 (see FIGS. 4 and 5). According to the above description the HGOVR flag 409 is set to 1 in step 507 for the time of one period, and the counters <Nelapsed> 411 and <Aver_period> 412 are reset to 0 in steps 508 and 509, because a new SID frame has been newly calculated and the averaging period is completed.

If the value of the counter <Nelapsed> 411 is lower than or equal to 30 when the block 506 makes a decision, then the hangover period has not yet ended. Then the HGOVR flag 409 is reset to the value 0 in step 510 and the value of the counter <Aver_period> 412 is decreased by one in step 511, because the current frame belongs to the averaging period controlled by the discontinuous transmission mode control block of the transmitter. The averaging may be interrupted prematurely if any of the following frames again contain an SP flag 405 with a value of 1 before the number of frames with the SP flag value of 0 corresponding to the averaging period have been passed.

If it is found in step 505 that the SP flag 405 of the immediately preceding frame also was 0, then the examined frame can not mean that the hangover period is completed, and thus the HGOVR flag 409 is reset to 0 in step 512.

Next a decision is made in step 513 based on the value of the counter <Aver_period> 412. If its value is not 0, then the averaging period has not ended, so the value of the counter 412 is decreased by one in step 514, because the examined frame belongs to the averaging period controlled by the control block of the transmitter's discontinuous transmission mode. Also now the averaging may be interrupted prematurely if any of the following frames again contain an SP flag 405 with a value of 1 before the number of frames with the SP flag value of 0 corresponding to the averaging period have been passed.

If it is found in step 513 that the value of the counter <Aver_period> 412 is 0, then the averaging period is completed, whereby the transmitter's radio section 111 gets a new SID frame, whereby the value of the counter <Nelapsed> 411 can be reset to 0 in step 515, according to the definition of the counter.

The control unit 408 of the receiver's speech decoder will know, by merit of the invention, whether or not a hangover period follows the speech period. This information can be used in combination with certain quantization and dequantization methods and it presents a possibility to synchronize the quantization for the SID frames between the transmitting and the receiving side. Due to the synchronization of the hangover period according to the invention it is possible to use predictive quantization methods in the quantization of the parameters required to generate the comfort noise, because the quantized parameters stored during the hangover period in the speech encoder and decoder contain values which very well describe the background noise at the transmitting side. The stored parameter values can be averaged when the averaging period is completed, whereby we obtain predicted values for both the quantization and dequantization algorithms. The synchronization of the speech encoder and decoder which is obtained due to the invention can be used also for instance for synchronized setting of the initial values of the pseudo noise generator in the speech encoder and decoder.

The improvement of the discontinuous transmission mode according to the invention is not limited to a speech encoder of a certain type. The synchronization of the encoder and decoder according to the invention presents particular benefits in speech encoders where the parameters are quantizedd and encoded using predictive methods. In the following we will discuss the calculation of the parameters in a speech encoder and decoder according to the invention.

As an illustrative case we discuss a generally known codec structure of the CELP (Code Excited Linear Prediction) type which is based on code excited linear prediction. The operation of a speech encoder and decoder of the CELP type is based on a so called code book, or excitation vectors stored in code books. These excitation vectors are filtered through a long-term and a short-term synthesis filter, and the resulting synthesized signal is compared to the original speech signal. Among the excitation vectors that vector is selected which minimizes the error in comparison to the original speech signal. Parameters transmitted to a decoder of the CELP type are typically: the excitation of the code vector (or an index to a certain excitation vector) and its gain g, the filtering parameters of the short-term prediction LPC, and the filtering parameters of the long-term prediction LTP.

In the comfort noise generation in a system according to the invention, information about coding parameters is transmitted, e.g. about the LPC parameters a0 ... aM (LPC, Linear Prediction Coding) and about the gain g. In the encoding of the LPC parameters we can use for example the method presented in the publication |2|:F. Itakura: "Line Spectral Representation of Linear Predictive Coefficients of Speech Signals", J. Acoust. Soc. Amer., Vol. 57, Suppl. No. 1, p. 35, 1975. The averaged comfort noise parameters calculated by the speech encoder according to the invention are e.g. $f^{mean}$ and $g_c^{mean}$. These parameters are quantized and the resulting quantized parameters $\hat{e}$ (prediction error) and $\hat{\gamma}$ (gain correction factor) are actually transmitted in a SID frame to the receiver, where the speech decoder will generate the comfort noise parameters based on these received parameters $\hat{e}$ and $\hat{\gamma}$, whereby the dequantized comfort noise parameters are for instance $\hat{f}^{mean}$ and $\hat{g}_c^{mean}$ to describe the background noise on the transmitting side and thus to generate synthetic noise. The encoding of the comfort noise parameters $f^{mean}$ and $g_c^{mean}$ utilizes the parameters $\hat{f}^{ref}$ and $\hat{g}^{ref}$, which can be defined in the speech decoder by merit of the invention, i.e. when the occurrence of the hangover period is known.

The speech encoder forms a vector representation $f^T = [f_1 \, f_2 \ldots f_M]$ of the spectral parameters (the LSP parameters), preferably a so called LSF vector representation (Line Spectral Frequency). It is also possible to calculate several parameter vectors for a certain speech frame. Predictive coding can be used for the encoding of the parameters. In the system according to the invention the parameters $\hat{f}^{ref}$, which are averaged during the hangover period, are used as prediction values. The vector $\hat{f}^{ref}$ is used when the prediction error is calculated, and this calculation is possible when we according to the invention know that the hangover period is present. Due to the invention the values of the parameter vector $\hat{f}^{ref}$ can be calculated both in the encoder and in the decoder in the same way, because during the hangover period the same parameters are available both in the encoder and in the decoder. However, here we must observe that the vectors $\hat{f}^{ref}$ and $\hat{g}^{ref}$ obtained during the latest hangover period can be utilized in the quantization of the comfort noise parameters also outside (after) the latest hangover period.

The prediction error e, which is generated by the speech encoder and transmitted in the communication system, is the parameter to be quantized, and it is obtained in the following way and transmitted:

$$e(i) = f^{mean}(i) - \hat{f}^{ref} \tag{1}$$

where $f^{mean}(i)$ is the averaged LSF parameter vector, $\hat{f}^{ref}$ is the quantized reference LSF parameter vector, i is the frame index, and e(i) is the computed prediction residual at the frame i.

The reference LSF parameter vector $\hat{f}^{ref}$ is calculated on the basis of quantized parameters by averaging the parameters during the hangover period (or over 7 frames) according to the equation below:

$$\hat{f}^{ref} = \frac{1}{7} \sum_{n=1}^{7} \left( \frac{1}{2} \sum_{m=1}^{2} \hat{f}^{(m)}(i-n) \right) \tag{2}$$

where $\hat{f}^{(m)}(i-n)$ is the m:th quantized LSF parameter vector of a frame during the hangover period (n=1 to 7);

n is the hangover period frame index (n=1 to 7);

m is the LSF parameter index within a frame (1 or 2); and i is the frame index.

Thus it is possible to calculate the reference parameter vector $\hat{f}^{ref}$, when the occurrence of the hangover period is known according to the invention. The averaged LSF parameter vector $f^{mean}$, i.e. the comfort noise spectral envelope parameter, is calculated during the averaging period on the basis of equation (3):

$$f^{mean}(i) = \frac{1}{8} \sum_{n=0}^{7} \left( \frac{1}{2} \sum_{m=1}^{2} f^{(m)}(i-n) \right) \tag{3}$$

where $f^{(m)}(i-n)$ is the m:th LSF parameter vector of a frame during the averaging period (n=0 to 7);

n is the averaging period frame index (n=0 to 7);

m is the LSF parameter index within a frame (1 or 2); and i is the frame index.

In the encoding of the gain values we correspondingly utilize the parameters $g_c^{mean}$ and $\hat{g}^{ref}$, of which the latter or the reference gain factor $\hat{g}^{ref}$ can be defined in the following way when we know the occurrence of the hangover period:

$$\hat{g}_c^{ref} = \frac{1}{7} \sum_{n=1}^{7} \left( \frac{1}{4} \sum_{j=1}^{4} \hat{g}_c(i-n)(j) \right) \tag{4}$$

where i is the frame index;

j is the subframe index;

n is the hangover period frame index (n=1 to 7); and $\hat{g}_c(i-n)(j)$ is the quantized fixed codebook gain factor in subframe j in the hangover period frame i.

The gain factors $g_c^{mean}(i)$, i.e. the comfort noise level parameters, are averaged by the equation below:

$$g_c^{mean} = \frac{1}{8} \sum_{n=0}^{7} \left( \frac{1}{4} \sum_{j=1}^{4} g_c(i-n)(j) \right) \tag{5}$$

where i is the frame index;

j is the subframe index;

$g_c(i)(j)$ is the gain of the frame i (n=0);

$g_c(i-n)(j)$ is the fixed codebook gain factor in subframe j of one of the averaging period frames, n=0 to 7; and n is the averaging period frame index (n=0 to 7).

In the same way as in the encoding of the spectral parameter vectors, we can utilize the solution according to the invention also in the encoding of the gain values, in which the calculation of the same parameter values $\hat{g}_c^{ref}$ is possible both in the encoder and in the decoder due to the observation of the hangover period, i.e. when we know the occurrence and the length of the hangover period. In our example the factor to be quantized is the so called gain correction factor γ, which is actually transmitted in the communication system, and on the basis of which the speech decoder can generate the comfort noise parameter $\hat{g}_c^{mean}$, so that it first generates the reference gain factor $\hat{g}_c^{ref}$ of the fixed codebook (the reference gain factor can be generated in the speech decoder when we know the occurrence of the hangover period). The gain correction factor γ can be generated in the speech encoder in the following way:

$$\gamma = \frac{g_c^{mean}(i)}{\hat{g}_c^{ref}} \tag{6}$$

where $g_c^{mean}(i)$ is the averaged gain factor of the fixed codebook; and $\hat{g}_c^{ref}$ is the reference gain factor of the fixed codebook which is calculated on the basis of the quantized gain factors of the fixed codebook by averaging the parameter values over a hangover period comprising 7 frames in accordance with the equation (4) presented above.

In the speech decoder of the receiver the calculation of the parameters $\hat{g}_c^{mean}$ and $f^{mean}$ is carried out in the inverse order of equations (1) and (6) when the quantized parameters ê (prediction error) and $\hat{\gamma}$ (gain correction factor) have been received, and when the parameters $\hat{f}^{ref}$ and $\hat{g}_c^{ref}$ have been calculated on the basis of the hangover period, when the speech decoder according to the invention knows the occurrence of the hangover period.

When the hangover period is synchronized in accordance with the invention we can avoid the disadvantages relating to the the prior art averaging of the GS parameters, particularly we can avoid the fact that the averaged parameters would contain information representing short noise peaks instead of values representing typical background noise. The invention requires that the receiver equipment must store into its memory the contents of the last speech frames, in the GSM the seven last speech frames, because the algorithm according to the invention detects the presence of the hangover period only when it is ended, and thus the background noise information contained in the last speech frames must at all times be stored and available for a possible averaging need.

When a predictive quantization method is used with the invention it is preferable that the quantization of the parameters belonging to the generation of the comfort noise uses the same quantization tables which the predictive quantization method uses in the normal speech encoding. Then the prediction should have a non-adaptive function when the transmission is discontinued. The prediction methods should use values, which are as close as possible to the values representing current background noise at the transmission end, so that the quantization section can describe the variations of the parameter values when the background noise varies around the average level. The same prediction values must of course be available both in the transmitter and in the receiver devices so that the predictive method can function correctly.

One solution to obtain good prediction values for the quantization of the comfort noise values transmitted in the SID frames is to store the quantized parameter values during the hangover period and to calculate the average value of the stored and quantized values when the hangover period is ended. These averaged prediction values are frozen until the next hangover period occurs. This process is well suited for the inventive method, i.e. when the speech decoder knows whether or not the speech period is followd by a hangover period.

The invention is applicable in all radio communication systems using the discontinuous transmission mode with hangover periods, particularly in the mobile phone systems DCS 1900 and GSM. The above presented exact figures, such as the length of the hangover period and the averaging period expressed in frames, are not essential for the invention, but they were used to illustrate the applicability of the invention. The speech decoding according to the invention can be used in a mobile phone and in a base station of a mobile phone system, i.e. generally in a transceiver, whether it is a mobile phone or a base station. Preferably the invention is applied in the receiving branch of a transceiver.

What is claimed is:

1. A method to detect a presence of a hangover period in a speech decoder (16) in a communication system utilizing discontinuous transmission between a transmitter and a receiver, whereby the discontinuous transmission comprises temporally sequential frame periods of which some periods will contain a transmitted frame and some periods will contain no transmission, constituting;

information transmission periods (200; 301; 302) comprising at least one frame and containing information given by a user to said transmitter, and silence periods (208, 209; 303) having a length of at least one frame period and containing other information than that given by the user;

whereby there is an irregularly occurring period (T) comprising at least one frame between an information transmission period (200) and the following silence period (208, 209), the irregular period forming a hangover period to determine the information relating to the silence period;

characterized in that in the receiver the number of frame periods is counted (411) until a certain moment;

the beginning of said silence period (208, 209; 303) is detected; and based on said counted number of frame periods and the beginning of the silence period (208, 209; 303) it is decided whether or not there is a hangover period (T) between said information transmission period (200; 301; 302) and the silence period (208, 209; 303) following the information transmission period.

2. A method according to claim 1, characterized in that said discontinuous transmission comprises an averaging period (211, 212) with a length of a predetermined number of frame periods, of which at least the last frame period is a frame period belonging to the silence period (208, 209; 303);

whereby in said transmission the speech decoder gets an information signal (107, 405) for each frame period, the signal having a first value if the frame period belongs to an information transmission period (200; 301; 302) or to a hangover period (T), and a second value if the frame period belongs to a silence period (208, 209; 303);

and in which method the number of frame periods is counted (411) in the receiver until the last frame period (0) of the averaging period (211, 212);

the moment when said information signal (405) changes from said first value to said second value is detected; and based on said counted number of frame periods and said detection it is decided whether or not there is a hangover period (T) between said information transmission period (200; 301; 302) and the silence period (208, 209; 303) following the information transmission period.

3. A speech decoder for the decoding of speech frames received in discontinuous transmission comprising:

means (402) performing the speech decoding in order to decode the received speech frame for reproduction;

comfort noise generation means (407) to generate synthetic noise for said reproduction; and speech decoding control means (408) to control the speech decoding;

whereby said discontinuous transmission comprises temporally sequential frame periods of which some periods will contain a transmitted frame and some periods contain no transmission, constituting information transmission periods (200; 301; 302) comprising at least one frame and containing information given by a user to said transmitter device, and silence periods (208, 209; 303) having a length of at least one frame period and containing other information than that given by the user;

whereby there is an irregularly occurring period (T) comprising at least one frame between an information transmission period (200) and the following silence period (208, 209), the irregular period forming a hangover period to determine the information relating to the silence period;

characterized in that it comprises means (411) counting the number of frame periods until a predetermined moment;

means (410) detecting the beginning of said silence period (208, 209; 303); and means (410) deciding on the basis of said counted number of frame periods and the beginning of the silence period (208, 209; 303) whether or not there is a hangover period (T) of said type between said information transmission period (200; 301; 302) and the silence period (208, 209; 303) following the information transmission period.

4. A speech decoder according to claim 3, characterized in that said discontinuous transmission comprises:

an averaging period (211, 212) with a length of a predetermined number of frame periods, of which at least the last frame period is a frame period belonging to the silence period (208, 209; 303);

whereby in said transmission the speech decoder gets an information signal (107, 405) for each frame period, the signal having a first value if the frame period belongs to an information transmission period (200; 301; 302) or to a hangover period (T) and a second value if the frame period belongs to a silence period (208, 209; 303);

said counting means (411) comprise means to count the number of frame periods in the receiver until the last frame period (0) of the averaging period (211, 212);

said detection means (410) comprise means to detect the moment when said information signal (405) changes from said first value to said second value; and said decision means (410) comprise means to decide based on said number of frame periods counted by said counting means (411) and said detection performed by said detection means (410) whether or not there is a hangover period (T) of said type between said information transmission period (200; 301; 302) and the silence period (208, 209; 303) following the information transmission period.

5. A transceiver for a mobile phone system utilizing discontinuous transmission, the transceiver comprising a transmitter branch to transmit messages and a receiver branch to receive messages, the receiver branch having a speech decoder comprising:

means (402) performing the speech decoding in order to decode the received speech frame for reproduction;

comfort noise generation means (407) to generate synthetic noise for said reproduction; and speech decoding control means (408) to control the speech decoding;

whereby said discontinuous transmission comprises temporally sequential frame periods of which some periods will contain a transmitted frame and some periods contain no transmission, constituting information transmission periods (200; 301; 302) comprising at least one frame and containing information given by a user to said transmitter device, and silence periods (208, 209; 303) having a length of at least one frame period and containing other information than that given by the user;

whereby there is an irregularly occurring period (T) comprising at least one frame between an information transmission period (200) and the following silence period (208, 209), the irregular period forming a hangover period to determine the information relating to the silence period;

characterized in that it comprises means (411) counting the number of frame periods until a predetermined moment;

means (410) detecting the beginning of said silence period (208, 209; 303); and means (410) deciding on the basis of said counted number of frame periods and the beginning of the silence period (208, 209; 303) whether or not there is a hangover period (T) of said type between said information transmission period (200; 301; 302) and the silence period (208, 209; 303) following the information transmission period.

6. A transceiver according to claim 5, characterized in that said discontinuous transmission comprises:

an averaging period (211, 212) with a length of a predetermined number of frame periods, of which at least the last frame period is a frame period belonging to the silence period (208, 209; 303);

whereby in said transmission the speech decoder gets an information signal (107, 405) for each frame period, the signal having a first value if the frame period belongs to an information transmission period (200; 301; 302) or to a hangover period (T) and a second value if the frame period belongs to a silence period (208, 209; 303);

said counting means (411) comprise means to count the number of frame periods in the receiver until the last frame period (0) of the averaging period (211, 212);

said detection means (410) comprise means to detect the moment when said information signal (405) changes from said first value to said second value; and said decision means (410) comprise means to decide based on said number of frame periods counted by said counting means (411) and said detection performed by said detection means (410) whether or not there is a hangover period (T) of said type between said information transmission period (200; 301; 302) and the silence period (208, 209; 303) following the information transmission period.

7. A transceiver according to claim 5, characterized in that it is a mobile phone.

8. A transceiver according to claim 5, characterized in that it is base station.

* * * * *